UNITED STATES PATENT OFFICE.

ROBERT B. HURD, OF PATERSON, NEW JERSEY.

IMPROVEMENT IN COMPOSITIONS FOR WASHING CLOTHES.

Specification forming part of Letters Patent No. 189,739, dated April 17, 1877; application filed January 23, 1877.

*To all whom it may concern:*

Be it known that I, ROBERT B. HURD, of Paterson, in the county of Passaic and State of New Jersey, have invented a new and useful composition, which is especially applicable to washing clothes; and I do hereby declare the following to be such a full, clear, and exact description thereof as will enable any one skilled in the arts to which it most nearly appertains to make and use the same.

My said composition consists of a solution composed of sal-soda, borax, soap, ammonia, and water, prepared and united in about the proportions as follows:

First, take four pounds of sal-soda, four pounds of refined borax, and one pound of soap, shaved fine; dissolve these in ten gallons of boiling water, then add five gallons of cold water.

Second, add to the above solution liquor of ammonia of the strength of 16° Baumé, gallon for gallon.

The ingredients of which the above mixture is made have heretofore been used together in the manufacture of soap, but not in the proportion above specified, to form a strong solution. I do not intend to claim every compound or composition which these ingredients are capable of making when united in different proportions; nor do I intend to limit my claim to the exact proportions here given, as they may be slightly varied without materially changing the result, though it is better to adhere to the proportions above specified.

I claim as my invention—

A composition consisting of sal-soda, borax, soap, ammonia, and water, proportioned in relation to each other, substantially as described, to form a solution for washing clothes or for other similar purposes.

R. B. HURD.

Witnesses:
JAS. L. MARSH,
WALLACE D. REED.